United States Patent [19]

Shimizu et al.

[11] Patent Number: 4,506,953
[45] Date of Patent: Mar. 26, 1985

[54] REFLECTION PREVENTIVE LIGHT-SHIELDING SCREEN AND A PROCESS FOR PRODUCING THE SAME

[75] Inventors: Kunio Shimizu; Yuichi Kame; Yoshimasa Tsuji, all of Shizuoka, Japan

[73] Assignee: Asahi Kasei Kogyo Kabushiki Kaisha, Osaka, Japan

[21] Appl. No.: 378,813

[22] Filed: May 17, 1982

[30] Foreign Application Priority Data

May 18, 1981 [JP] Japan ................... 56-73423
May 18, 1981 [JP] Japan ................... 56-73424

[51] Int. Cl.³ .............................. G02B 5/00
[52] U.S. Cl. .................................. 350/276 R
[58] Field of Search .......................... 350/276 R

[56] References Cited

U.S. PATENT DOCUMENTS 2,053,173  9/1936  Astima ................... 350/276
4,309,070  1/1982  St. Leger Searle ........ 350/174

FOREIGN PATENT DOCUMENTS 50-92751  7/1975  Japan .

*Primary Examiner*—John K. Corbin
*Assistant Examiner*—Rebecca D. Gass
*Attorney, Agent, or Firm*—Armstrong, Nikaido, Marmelstein & Kubovcik

[57] ABSTRACT

A reflection preventive light-shielding screen comprising a transparent plate and a side surface-rough relief of a cured photopolymerized resin composition formed thereon and having a striped pattern or a lattice pattern. The present reflection preventive light-shielding screen can effectively shield extraneous light rays without scattering the light rays emitted from image-indicating devices. Therefore, the present reflection preventive light-shielding screen can be advantageously used for various extraneous light rays-shielding applications. Furthermore, the present reflection preventive light-shielding screen can be produced by an extremely simple process as compared with those of the prior art.

18 Claims, 7 Drawing Figures

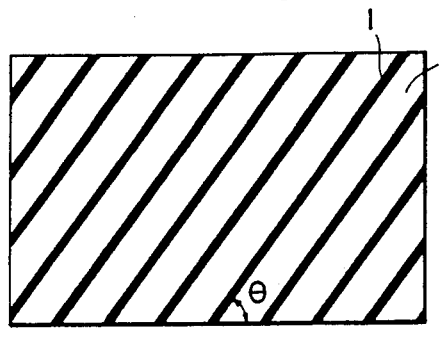
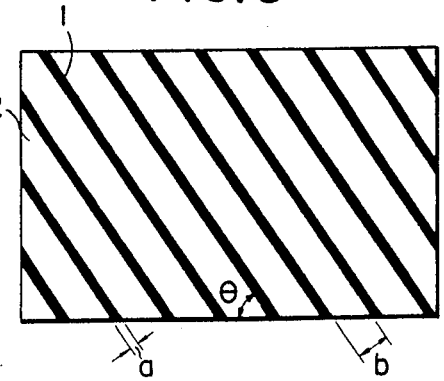
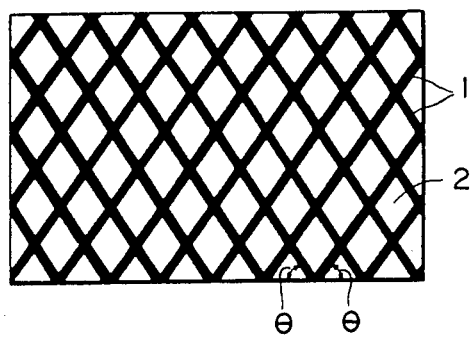

REFLECTION PREVENTIVE LIGHT-SHIELDING SCREEN AND A PROCESS FOR PRODUCING THE SAME

The present invention relates to a reflection preventive light-shielding screen (hereinafter frequently referred to simply as "light-shielding screen") and a process for producing the same. More particularly, the present invention is concerned with a reflection preventive light-shielding screen which can be advantageously employed for extraneous light rays-shielding applications for various image-indicating devices such as television receivers, various displays having a CRT (cathoderay tube) and related to computers, various indicators such as indicators for instruments, traffic signals and the like.

Extraneous light rays are often incident on the faces of various image-indicating devices and reflect therefrom, which leads to the deterioration of an image projected. In order to prevent the deterioration of the projected image due to the reflection of extraneous light rays, various light-shielding screens have heretofore been proposed. For example, Japanese Patent Application Laid-Open Specification Nos. 92751/1975, 44186/1976 and 75456/1976 disclose light-shielding screens comprising a plurality of transparent plastic layers, a plurality of light-reflecting layers and a plurality of light-shielding layers which are put on top of each other. Such light-shielding screens are produced by a process which comprises superimposing transparent layers, a light-reflecting layers and light-shielding layers on top of each other to form a block consisting of laminated layers and slicing the resulting block at a predetermined angle, usually perpendicularly, relative to the laminated layers. As is apparent from the foregoing, very complicated procedures are required to produce the light-shielding screen. Further, the proposed light-shielding screens inevitably have entirely roughened surfaces. Illustratively stated, all the surface exposed by slicing is caused to have a roughened surface and, hence, even the surfaces of the transparent plastic layers through which the light rays emitted from the image-indicating devices pass are caused to be rough. Because of the entirely roughened surface, the conventional light-shielding screens scatter not only extraneous light rays incident but also light rays emitted from the image-indicating devices, so that the image through the light-shielding screen is dim and lacks clearness. This is a serious disadvantage of the conventional light-shielding screens from a practical point.

The present inventors have made extensive and intensive studies with a view to eliminating the above-mentioned drawbacks of the conventional light-shielding screens and to providing a reflection preventive light-shielding screen which can be advantageously used for extraneous light rays-shielding applications and can be simply produced. As a result, the present inventors have found that an excellent extraneous light rays-shielding effect can be achieved without scattering light rays emitted from the image-indicating devices by a light shielding screen comprising a transparent plate and a relief of a cured photopolymerized resin composition having a striped or lattice pattern, said relief being constituted of a plurality of relief line portions corresponding to said striped or lattice pattern and having at least their respective side surfaces roughened. Hereinafter, instead of such an expression as "at least the side surfaces of the relief line portions", a simple expression, for example, "surface of the relief" is often used.

The present invention has been made based on such a novel finding.

Accordingly, it is an object of the present invention to provide a reflection preventive light-shielding screen which can be advantageously used for various extraneous light rays-shielding applications.

It is another object of the present invention to provide a process for producing a reflection preventive light-shielding screen of the kind described above.

The foregoing and other objects, features and advantages of the present invention will be apparent from the following description taken in connection with the accompanying drawings in which:

FIG. 5 is a front view of a further form of a reflection preventive light-shielding screen according to the present invention;

FIG. 6 is a front view of a still further form of a reflection preventive light-shielding screen according to the present invention; and FIG. 7 is a front view of a still further form of a reflection preventive light-shielding screen according to the present invention.

In FIGS. 1 through 7, like portions or like parts are designated by like numerals or like characters.

In one aspect of the present invention, there is provided a reflection preventive light-shielding screen which comprises a transparent plate and a relief of a cured polymerized resin composition having a striped pattern or a lattice pattern and supported by said transparent plate on its surface, said relief being constituted of a plurality of relief line portions corresponding to said striped pattern or lattice pattern and having at least their respective side surfaces roughened.

Figure 1:
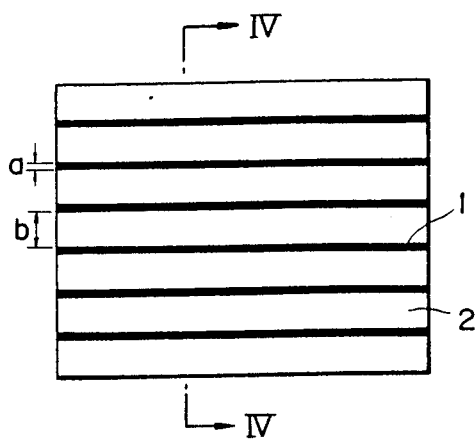
FIG. 1 is a front view of one form of a reflection preventive light-shielding screen according to the present invention.

Referring now to FIG. 1, there is shown a front view of one form of a reflection preventive light-shielding screen according to the present invention, which comprises a transparent plate 2 and a relief 1 of a cured photopolymerized resin composition having a horizontally striped pattern and its surface roughened (not shown). The relief line portions of the relief 1 which constitute the horizontally striped pattern are arranged on the surface of the transparent plate 2 at intervals of b and each have a width of a.

Figure 2:
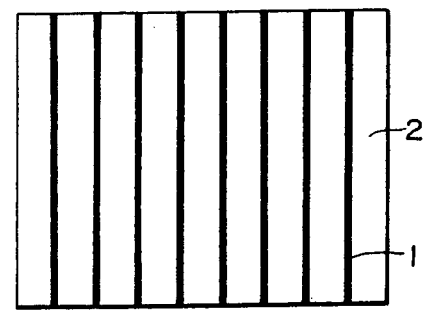
FIG. 2 is a front view of another form of a reflection preventive light-shielding screen according to the present invention.

In FIG. 2 is shown a front view of another form of a reflection preventive light-shielding screen according to the present invention, which comprises a transparent plate 2 and a relief 1 of a cured photopolymerized resin composition having a vertically striped pattern and its surface roughened (not shown).

Figure 3:
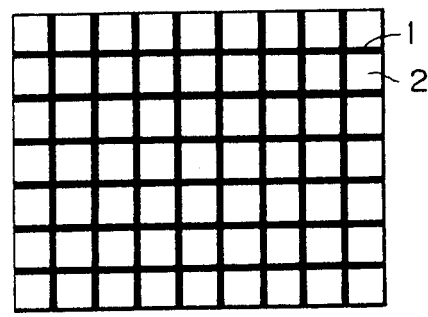
FIG. 3 is a front view of still another form of a reflection preventive light-shielding screen according to the present invention.

In FIG. 3 is shown a front view of still another form of a reflection preventive light-shielding screen according to the present invention, which comprises a transparent plate 2 and a relief 1 of a cured photopolymerized resin composition having an orthogonal lattice pattern and its surface roughened (not shown).

Figure 4:
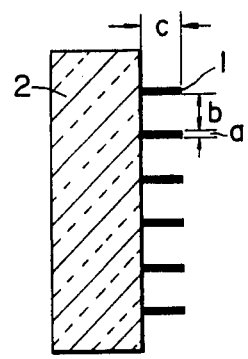
FIG. 4 is a cross-sectional view taken on the line IV—IV of FIG. 1.

In FIG. 4 is shown a cross-sectional view taken on the line IV—IV of FIG. 1, in which numeral 1 designates a relief of a cured photopolymerized resin composition having a horizontally striped pattern, numeral 2 a transparent plate, character a the width of the relief line portions of the relief 1, character b the interval of the relief line portions of the relief 1, and character c the height of the relief line portions of the relief 1.

In FIG. 5 is shown a front view of a further form of a reflection preventive light-shielding screen according to the present invention, which comprises a transparent plate 2 and a relief 1 of a cured photopolymerized resin composition having a left aslant striped pattern and its surface roughened (not shown). The left striped pattern has a slanting angle of $\theta$ relative to the horizontal direction as viewed against the surface of the transparent plate 2.

In FIG. 6 is shown a front view of a still further form of a reflection preventive light-shielding screen according to the present invention, which comprises a transparent plate 2 and a relief 1 of a cured photopolymerized resin composition having a right aslant striped pattern and its surface roughened (not shown). The relief line portions of the relief 1 which constitute the right aslant striped pattern are arranged on the surface of the transparent plate 2 at intervals of b and each have a width of a and a slanting angle of $\theta$ relative to the horizontal direction as viewed against the surface of the transparent plate 2.

In FIG. 7 is shown a front view of a still further form of a reflection preventive light-shielding screen according to the present invention, which comprises a transparent plate 2 and a relief 1 of a cured photopolymerized resin composition having a slanted lattice pattern and its surface roughened (not shown). The slanted lattice pattern is constituted of left aslant stripes with a slanting angle of $\theta$ and right aslant stripes with a slanting angle of $\theta$, said slanting angle being given as an angle relative to the horizontal direction as viewed against the surface of the transparent plate 2. The slanting angle of left aslant stripes may be equal to or different from the slanting angle of the right aslant stripes as far as the sianting angle is in the range of 30° to 60° which will be mentioned later.

The reflection preventive light-shielding screen of the present invention has such an advantage that it not only can effectively shield extraneous light rays incident on various image-indicating devices, indicators for instruments and the like but also does not scatter light rays emitted from the image-indication devices. This is so because the present light-shielding screen has smooth transparent portions for passing light rays emitted from the image-forming devices as opposed to the conventional light shielding screens in which the surfaces of the transparent layers are rough. Therefore, the image through the light-shielding screen of the present invention is very clear. Further, the present light-shielding screen has a relief having a uniform and sharp pattern, so that a uniform image having a high contrast can be enjoyed. Moreover, the relief of the present light-shielding screen has its surface roughened and therefore the reflection of light rays emitted from the image-indicating devices on the side surfaces of the relief line portions constituting the pattern of the relief can be effectively prevented, so that an undesired duplicate image, namely ghost image, does not occur. In addition to the excellent performance as mentioned above, the present light-shielding screen has also a great advantage over the conventional light-shielding screens that the present light-shielding screen can be produced by an extremely simple process.

In the present invention, the striped pattern or lattice pattern of the relief may be linear or curved. However, from the standpoint of easiness of preparation of the pattern and clearness of the image projected on various displays, it is preferred that the relief have a linear pattern. Example of the linear pattern include a horizontally striped pattern, a vertically striped pattern, an aslant striped pattern, an orthogonal lattice pattern and a slanted lattice pattern as viewed against the surface of the transparent plate.

When the present light-shielding screen is employed for an image-indicating device having a CRT, it is preferred that the relief pattern of the light-shielding screen be selected according to the kind of scanning lines of the CRT.

In the present invention, in the case where the relief has an aslant striped pattern or a slanted lattice pattern as depicted in FIGS. 5 to 7, it is preferred that the pattern have a slanting angle ($\theta$) of 30° to 60° relative to the horizontal direction as viewed against the surface of the transparent plate.

As mentioned above, when the relief has a slanted lattice pattern constituted of left aslant stripes with a slanting angle of $\theta$ and right aslant stripes with a slanting angle of $\theta$, the slanting angle of left aslant stripes may be equal to or different from the slanting angle of the right aslant stripes as far as the slanting angle is in the range of 30° to 60°. When the relief has an aslant striped pattern constituted of left aslant stripes or right aslant stripes, the aslant stripes may be in parallel or not in parallel as far as the slanting angle is in the range of 30° to 60°. This may also apply to each of the left and right aslant stripes constituting the above-mentioned slanted lattice pattern.

When the light-shielding screen comprising the relief having an aslant striped pattern or slanted lattice pattern with a slanting angle of less than 30° or more than 60° relative to the horizontal direction as viewed against the surface of the transparent plate is used, for example, for a television receiver, an undesirable phenomenon of image known as "moiré" tends to occur. Whereas, when the light-shielding screen comprising the relief having an aslant striped pattern or slanted lattice pattern with a slanting angle of 30° to 60° C. relative to the horizontal direction as viewed against the surface of the transparent plate is used, occurrence of such an undesirable phenomenon of image can be extremely lowered and, further, extraneous light rays even from all directions can be effectively shielded.

The form of the relief having its surface roughened is preferably as follows. With respect to the height c of each of the relief line portions of the relief which constitute a striped pattern or a lattice pattern, it is preferred that the height of each of the relief line portions be in the range of 40 to 2,000$\mu$, more preferably 200 to 1,200$\mu$. In case the height of each of the relief line portions is less than 40$\mu$, extraneous light rays having a large angle of incidence cannot be shielded effectively. On the other hand, in case the height of each of the relief line portions is more than 2,000$\mu$, the height of a visual point at which an image can be seen is extremely limited and, further, difficulties are encountered in forming a relief on the transparent plate. With respect to the width a of each of the relief line portions of the relief which constitute a striped pattern or a lattice pattern, it is preferred that the width of each of the relief line portions be in the range of 20 to 500μ, more preferably 100 to 300μ. When the width of each of the relief line portions is more than 500μ, the relief line portions are eyesores. On the other hand, when the width of each of the relief line portions is less than 20μ, difficulties are encountered in forming a relief on the transparent plate. With respect to the interval b of each of the relief line portions, it is preferred that the relief line portions be arranged on the transparent plate at intervals of 20 to 1,000μ, more preferably 200 to 600μ. When the interval of each of the relief line portions is less than 20μ, difficulties are encountered in seeing image. On the other hand, the interval of each of the relief line portions is more than 1,000μ, a sufficient light-shielding effect cannot be achieved. Accordingly, in the present invention, it is preferred that the ratio of the width a to the interval b of the relief line portions be 1:5 to 1:1, and the ratio of the interval b to the height c of the relief line portions be 1:0.6 to 1:2, more preferably 1:0.85 to 1:2.

In the present invention, it is essential that the relief of a cured photopolymerized resin composition has its surface roughened. The roughened surface of the relief serves to not only scatter extraneous light rays but also scatter light rays emitted from the image-indicating device and striking the relief, thereby to prevent the reflection thereof. To form such a roughened surface of the relief, it is preferred that the cured photopolymerized resin composition contains a delustering agent. The term "delustering agent" as used herein is intended to mean a finely divided solid which can be dispersed uniformly into a photopolymerizable resin composition (which will be described later) without undergoing any chemical or physical change such as chemical reaction or dissolution. As examples of such a delustering agent, there may be mentioned titanium oxide, a powdered mica, calcium carbonate, a powdered glass such as Glass Pearl (particle diameter: 5 to 15 μm) manufactured and sold by Kyoritsu Ceramics Co., Ltd., Japan, a finely divided silica such as Syloid (particle diameter: 0.5 to 20 μm) manufactured and sold by Fuji Davison Chemical Co., Ltd., Japan, and Aerosil (particle diameter: 0.5 to 20 μm) manufactured and sold by Nippon Aerosil Co., Ltd., Japan, aluminum powder, a powdered clay or the like. Of these delustering agents, a finely divided silica is most preferred from the standpoint of good dispersion, scattering of light rays and the like.

According to the present invention, a further improved light-shielding effect of the light-shielding screen can be attained by adopting a dyed relief. As dyes which may be used in the present invention, there may be mentioned a cationic dye, an acid dye, a disperse dye, a reactive dye, a metallized dye and the like.

In another aspect of the present invention, there is provided a process for producing a reflection preventive light-shielding screen which comprises interposing a layer of a photopolymerizable resin composition containing a delustering agent between a transparent plate and an image-bearing transparency having transparent portions and opaque portions which constitute a negative image of a predetermined striped pattern or lattice pattern, exposing said layer to an actinic light through said transparency to form cured photopolymerized resin composition portions and unpolymerized resin composition portions in said layer, removing said transparency, and removing the unpolymerized resin portions of said layer by means of a developer, whereby a relief having said predetermined striped pattern or lattice pattern is formed, said relief being constituted of a plurality of relief line portions corresponding to said striped pattern or lattice pattern and having at least their respective side surfaces roughened.

The process for producing a reflection preventive light-shielding screen according to the present invention is very simple as compared with the processes of the prior art as mentioned above.

A detailed explanation of the process of the present invention will now be given. As the transparent plate which may be used in the present invention, there may be mentioned a plate made of a transparent glass or plastics such as polymethyl methacrylate, polystyrene, polyvinyl chloride, polycarbonate, polypropylene, polyethylene telephthalate, acetylcellulose, polyacrylonitrile, polyamide, polyvinyl alcohol and the like. Of these materials, a transparent glass is preferably employed in the present invention for the following reasons. The transparent glass has excellent properties such as high light permeability, high hardness, high resistance to light and high resistance to weather as compared with other materials. However, the adhesion or bonding strength between the glass and a cured photopolymerized resin is relatively low. Therefore, in the present invention, it is preferred that a transparent glass which is subjected to a special treatment such as anchor treatment be used as the transparent plate. The anchor treatment of the transparent glass may be effected by applying onto the glass, for example, a silane compound such as vinyltrichlorosilane, vinyltriethoxysilane, β-(3,4-epoxycyclohexyl)ethyltrimethoxysilane, vinyltris(β-methoxyethoxy(silane, γ-glycidoxypropyltrimethoxysilane or γ-methacryloxypropyltrimethoxysilane. The thickness of the transparent plate to be used in the present invention is generally 1 to 10 mm. However, when a film or sheet of the above-mentioned plastics is used as the transparent plate, the thickness may be 20 μm to 10 mm, preferably 50 μm to 10 mm.

As a preferred example of photopolymerizable resin composition to be used in the present invention, there may generally be mentioned a composition comprising a prepolymer having a polymerizable ethylenically unsaturated group, optionally with a photopolymerization sensitizer, a heat-polymerization inhibitor and/or an ethylenically unsaturated monomer as a cross-linking agent. As examples of the prepolymer, there may generally be mentioned polymerization products such as unsaturated polyesters, alkyd resins, unsaturated polyurethanes and oligomers of an ester-acrylate type. In the present invention, the prepolymers may preferably have a number average molecular weight of 500 to 100,000.

More illustrative examples of the above-mentioned prepolymers will be given below:

(1) unsaturated polyesters prepared from at least one unsaturated dicarboxylic acid such as maleic acid, fumaric acid or itaconic acid, and/or its anhydride, and at least one polyhydric alcohol such as ethylene glycol, propylene glycol, diethylene glycol, triethylene glycol, glycerin, trimethylolpropane, pentaerythritol, 1,4-polybutadiene having terminal hydroxyl groups, hydrogenated or non-hydrogenated 1,2-polybutadiene having terminal hydroxyl groups, butadienestyrene copolymer having terminal hydroxyl groups or butadiene-acrylonitrile copolymer having terminal hydroxyl groups, and unsaturated polyesters prepared from at least one unsaturated dicarboxylic acid or its anhydride as mentioned above, at least one polyhydric alcohol as mentioned above, and at least one saturated polycarboxylic acid or its anhydride such as succinic acid, adipic acid, phthalic acid, isophthalic acid, phthalic anhydride, trimellitic acid or trimellitic acid anhydride;

(2) alkyd resins prepared by modifying the above-mentioned unsaturated polyesters with at least one drying oil and/or at least one semidrying oil;

(3) unsaturated polyurethanes having addition-polymerizable unsaturated groups introduced by utilizing terminal isocyanate and/or hydroxyl groups of polyurethanes derived from at least one polyol having two or more terminal hydroxyl groups and at least one polyisocyanate, for example, unsaturated polyurethanes which are prepared from (i) a polyurethane having terminal isocyanate and/or hydroxyl groups and prepared from at least one polyol such as a polyhydric alcohol as mentioned above, polyester polyol or polyether polyol and at least one polyisocyanate such as tolylene diisocyanate, diphenylmethane-4,4'-diisocyanate or hexamethylene diisocyanate and (ii) at least one unsaturated mono- or di-carboxylic acid as mentioned above or its ester or polyester having active hydrogen atoms derived from hydroxyl (reactive with the terminal isocyanate) and/or carboxyl (reactive with both of the terminal isocyanate and the terminal hydroxyl) and/or amino groups (reactive with the terminal isocyanate), and unsaturated polyurethanes obtained by linking two or more molecules of an unsaturated polyester as mentioned above with a polyisocyanate; and (4) oligomers of an ester-acrylate type obtained by the cocondensation of an esterification reaction system composed of a polycarboxylic acid or its anhydride and a polyhydric alcohol with acrylic acid and/or methacrylic acid and having a number average molecular weight of about 200 to about 5,000, said number average molecular weight being controlled by choosing an appropriate molar ratio of the raw materials, examples of said polycarboxylic acid or its anhydride being adipic acid, isophthalic acid, phthalic acid and phthalic anhydride, examples of said polyhydric alcohol being ethylene glycol, propylene glycol, diethylene glycol, triethylene glycol, glycerin, trimethylolpropane and pentaerythritol; epoxyacrylates, for example, esters of acrylic acid or methacrylic acid and a compound having epoxy groups obtained by condensation polymerization of a polyhydric alcohol or polyhydric phenol with epichlorohydrin or an alkylene oxide; and polymers having, in its side chains, carbon-carbon double bonds capable of taking an active part in the addition polymerization reaction, for example, polymers obtained by reacting an unsaturated carboxylic acid or its anhydride with a polymer having hydroxyl groups such as polyvinyl alcohol or cellulose, polymers obtained by esterifying a polymer or a copolymer of acrylic acid or methacrylic acid having carboxyl groups with an unsaturated alcohol such as allyl alcohol, glycidyl acrylate or glycidyl methacrylate, a polymer obtained by reacting a copolymer containing maleic anhydride monomer units with allyl alcohol, a hydroxyalkyl acrylate and/or a hydroxyalkyl methacrylate, and polymers obtained by reacting a copolymer having glycidyl acrylate and/or glycidyl methacrylate monomer units with acrylic acid and/or methacrylic acid.

In the present invention, prepolymers other than mentioned above may be employed. As such prepolymers, there may be mentioned unsaturated polyamides, unsaturated polyimides, unsaturated polyethers, unsaturated polyacrylates, unsaturated polymethacrylates, various rubbers and the like. Further, in the present invention, there may be employed, as the prepolymers, compounds having no ethylenic double bonds which may be photopolymerized by a mechanism not attributed to ethylenic double bonds.

As the ethylenically unsaturated monomer as a crosslinking agent which may be optionally used in the photopolymerizable resin composition, there may be mentioned commonly known ethylenically unsaturated monomers as follows:

(1) unsaturated carboxylic acids such as acrylic acid and methacrylic acid, or esters thereof, for example, alkyl acrylate, alkyl methacrylate, cycloalkyl acrylate, cycloalkyl methacrylate, alkyl halide acrylate, alkyl halide methacrylate, alkoxyalkyl acrylate, alkoxyalkyl methacrylate, hydroxyalkyl acrylate, hydroxyalkyl methacrylate, aminoalkyl acrylate, aminoalkyl methacrylate, tetrahydrofurfuryl acrylate, tetrahydrofurfuryl methacrylate, alkyl acrylate, allyl methacrylate, glycidyl acrylate, glycidyl methacrylate, benzyl acrylate, benzyl methacrylate, phenoxy acrylate, phenoxy methacrylate, mono- or di-acrylate of alkylene glycol, mono- or di-methacrylate or alkylene glycol, mono- or di-acrylate or polyoxyalkylene glycol, mono or di-methacrylate of polyoxyalkylene, trimethylolpropane triacrylate, trimethylolpropane trimethacrylate, pentaerythritol tetraacrylate, pentaerythritol tetramethacrylate;

(2) acrylamides and methacrylamides, or derivatives thereof, for example, an acrylamide N-substituted with an alkyl or hydroxyalkyl group, a methacrylate N-substituted with an alkyl or hydroxyalkyl group, an acrylamide N,N'-disubstituted with alkyl and/or hydroxyalkyl groups, a methacrylate N-N'-disubstituted with alkyl and/or hydroxyalkyl groups, diacetone acrylamide, diacetone methacrylate, N,N'-alkylene-bis-acrylamide, and N,N'-alkylene-bis-methacrylamide;

(3) allyl compounds such as allyl alcohol, allyl isocyanate, diallyl phthalate and triallyl cyanurate;

(4) maleic acid, maleic anhydride and fumaric acid, and esters thereof, for example, mono- or di-alkyl maleate, mono- or di-alkyl fumarate, mono- or di-haloalkyl maleate, mono- or di-haloalkyl fumarate, mono- or di-alkoxyalkyl maleate, mono- or di-alkoxyalkyl fumarate; and (5) other unsaturated compounds such as styrene, vinyltoluene, divinylbenzene, N-vinylcarbazole and N-vinylpyrrolidone. They may be used either alone or in combination. When they are employed in combination, an azide compound may be incorporated into the ethylenically unsaturated monomers. As such an azide compound, there may be mentioned 4,4'-diazidostilbene, p-phenylenebisazido, 4,4'-diazidobenzophenone, 4,4'-diazidodiphenylmethane, 4,4'-diazidochalcone, 2,6-di(4'-azidobenzal)cyclohexanone, 4,4'-diazidostilbene-α-carboxylic acid, 4,4'-diazidodiphenyl, disodium salt of 4,4'-diazidostilbene-2,2'-disulfonic acid and the like. The amount of the ethylenically unsaturated monomer which may be optionally incorporated into the above-mentioned prepolymer may usually be 200 parts or less by weight per 100 parts by weight of the prepolymer.

Various photopolymerization sensitizers as commonly used can be optionally employed in the photopolymerizable resin composition. Specific examples of such sensitizers include benzoin, benzoin ethyl ether, benzoin n-propyl ether, benzoin isopropyl ether, benzoin isobutyl ether, 2,2-dimethoxy-2-phenylacetophenone, benzophenone, benzil, diacetyl, diphenyl sulfide, eosin, thionine, 9,10-anthraquinone, 2-ethyl-9,10-anthraquinone, Michler's ketone [4,4'-bis-(dimethylamino)benzophenone] and the like. They may be used either alone or in combination. The amount of any photopolymerizable sensitizer is such as will be effective for polymerization, i.e., 0.001 to 10% by weight based on the photopolymerizable resin composition.

As the heat-polymerization inhibitor optionally employed in the photopolymerizable resin composition, there may be mentioned, for example, hydroquinone, tert-butylhydroquinone, benzoquinone, 2,5-diphenyl-p-benzoquinone, picric acid, di-p-fluorophenylamine, p-methoxyphenol, 2,6-di-tert-butyl-p-cresol and the like. They may be used either alone or in combination. The amount of any heat-polymerization inhibitor is such as will be effective for inhibiting heat polymerization, i.e., 0.005 to 5.0% by weight based on the prepolymer or the total weight of the prepolymer and the ethylenically unsaturated monomer. Photopolymerizable compositions other than mentioned above, for example, a composition comprising polyethylene, polythiol and a photopolymerization sensitizer as disclosed in Japanese Patent Application Publication No. 29525/1971 may also be employed in the present invention.

In the process of the present invention, a delustering agent is incorporated in the above-mentioned photopolymerizable resin composition. The delustering agent is uniformly dispersed into the photopolymerizable resin composition for providing a relief having its surface roughened. The roughened surface of the relief serves to scatter light rays as described before. As examples of the delustering agent which may be employed in the present invention, there may be mentioned titanium oxide, a powdered mica, calcium carbonate, a powdered glass such as Glass Pearl having a particle diameter of 5 to 15μ (trade name of a product manufactured and sold by Kyoritsu Ceramics Co., Ltd., Japan), a finely divided silica such as Syloid having a particle diameter of 0.5 to 20μ (trade name of a product manufactured and sold by Fuji Davison Chemical Co., Ltd., Japan) and Aerosil having a particle diameter of 0.5 to 20μ (trade name of a product manufactured and sold by Nippon Aerosil Co., Ltd., Japan), aluminum powder, a powdered clay and the like.

With respect to the particle diameter and amount of the delustering agent to be incorporated in the photopolymerizable resin composition, care should be taken so that good relief-forming characteristics (of the aforementioned interval, height and width of the relief line portions to be formed) of the photopolymerizable resin composition as well as sufficiently low surface reflectance of at least the side surfaces of the relief line portions to be formed can be attained. The surface reflectance for attaining the effect of the present invention is preferably 20% or less in terms of a value as measured according to the method which will be described later. The particle diameter and amount of the delustering agent to be employed in order to obtain the sufficiently low surface reflectance of the relief while maintaining the good relief-forming characteristics of the photopolymerizable resin composition with the delustering agent dispersed therein vary depending not only on the kind of the delustering agent but also on the kind of the photopolymerizable resin composition. But, in general the particle diameter of the delustering agent may be in the range of 0.5 to 20μ. The amount of the delustering agent may generally be in the range of 0.1 to 20% by weight, preferably 0.5 to 10% by weight based on the photopolymerizable resin composition. In general, in case the amount of the delustering agent is less than 0.1% by weight based on the photopolymerizable resin composition, an effect for shielding light rays is not sufficient. Whereas, in case the amount of the delustering agent is more than 20.0% by weight based on the photopolymerizable resin composition, the surface-roughening effect is not proportionally increased but the transparency of the photopolymerizable resin composition is rather lowered, so that a sharp and uniform relief can hardly be formed. Of the above-mentioned delustering agents, a finely divided silica is most preferred from the standpoint of good dispersion, scattering of light rays and the like.

The photopolymerizable resin composition containing the delustering agent is interposed, as a layer, between the transparent plate and an image-bearing transparency having transparent portions and opaque portions which constitute a negative image of a predetermined striped pattern or lattice pattern. For effecting such an interposition of a layer of the photopolymerizable resin composition, there may be employed two modes. In one mode, the photopolymerizable resin composition containing the delustering agent is superimposed on the transparent plate in the form of a layer. The layer may be formed by applying the photopolymerizable resin composition containing the delustering agent directly onto the transparent plate or laminating a sheet of the photopolymerizable resin composition containing the delustering agent directly onto the transparent plate. On the layer is then superimposed the transparency. Alternatively, the photopolymerizable resin composition containing the delustering agent may be first superimposed on the image-bearing transparency to form a layer thereof and the transparent plate is then superimposed. When a liquid or molten photopolymerizable resin composition containing a delustering agent is employed, the thickness of the layer of the photopolymerizable resin composition containing the delustering agent may be controlled by means of a thickness-controlling spacer. According to the present invention, it is preferred that the layer of the photopolymerizable resin composition containing the delustering agent be in direct contact with the image-bearing transparency from the standpoint of reproducibility of the relief. However, when a tacky photopolymerizable resin composition containing a delustering agent is employed, it is preferred that an interlayer film be provided between the image-bearing transparency and the layer of the photopolymerizable resin composition containing the delustering agent from the standpoint of protection of the image-bearing transparency and prevention of adhesion between the layer of the photopolymerizable resin composition and the image-bearing transparency. Examples of the interlayer film include a transparent film such as polypropylene film, polycarbonate film, polyethylene terephthalate film, acetyl cellulose film, polyvinyl alcohol film and cellophane. According to the present invention, the thickness of the layer of the photopolymerizable resin composition is preferably 40 to 2,000μ, more preferably 200 to 1,200μ.

As the material for the image-bearing transparency, there may be employed a material customarily used for the image-bearing transparency in the photo image-forming technique, for example, a material for a negative film for photoengraving such as a polyethylene terephthalate film or the like, a plastic synthetic resin film or sheet which can transmit actinic light, a transparent glass sheet, cellophane or the like. The striped pattern or lattice pattern constituted of transparent portions and opaque portions may be formed on the abovementioned material for the image-bearing transparency by a conventionally known method such as printing. The width of each of the transparent portions is preferably 20 to 500μ, more preferably 100 to 300μ, and the width of each of the opaque portions is preferably 20 to 1,000μ, more preferably 200 to 600μ.

As the actinic radiation source which may be used in the present invention, there may be mentioned, for example, a mercury lamp, an arc lamp, a xenon lamp, an ultraviolet fluorescent lamp, sun light and the like.

On irradiation of the layer of the photopolymerizable composition with the actinic light through the image-bearing transparency, the areas of the layer of the photopolymerizable resin composition exposed to the actinic light are photopolymerized and cured while the areas of the layer of the photopolymerizable resin composition not exposed to the actinic light remain unpolymerized. As a result, cured photopolymerized portions (exposed areas) and unpolymerized portions (unexposed areas) are provided in the layer of the photopolymerizable resin composition. After irradiation with the actinic light, the image-bearing transparency is removed and the abovementioned interlayer film, if any, is also removed, and then the unpolymerized portions of the layer of the photopolymerizable resin composition are removed to form a reief having the predetermined striped pattern or lattice pattern and having its side surfaces roughened. The unpolymerized portions may be removed by various conventional methods using a developer. For example, the plate from which the image-bearing transparency has been removed is attached on a drum or a flat plate so that the face to be developed is set upward and a developer is sprayed on the plate to wash away the unpolymerized portions (unexposed areas). Alternatively, the unpolymerized portions may be removed by brushing the face to be developed with a developing solution-bearing brush. Although the suitable developer varies depending on the kind of a photopolymerizable resin composition, the kind of the developer is not critical. There can be employed any of those capable of selectively dissolving a photopolymerizable resin composition portion while leaving a cured photopolymerized resin composition portion undissolved. As examples of the developer, there can be mentioned water, a weakly alkaline solution optionally with an additive such as a surface active agent, various organic solvents such as 1,1,1-trichloroethane, tetrachloroethylene, trichloroethylene, tetrachloroethane, toluene and mixtures thereof, surface active agents such as an anionic or nonionic surface active agent, and the like. With respect to the unsaturated polyesters, weakly alkaline aqueous solutions such as aqueous solutions of sodium hydroxide, sodium carbonate, sodium borate and the like are especially preferred [With respect to the details of developers, reference may be made to the book entitled "Photopolymer" published by CMC in 1976, Japan].

In the present invention, a relief formed on the transparent plate may be dyed with a dye for further improving extraneous light rays-shielding effect of the present light-shielding screen. As such a dye, there may be mentioned a cationic dye such as "Diacryl Black KSL-N" (trade name of a cationic dye produced and sold by Mitsubishi Chemical Industries Limited, Japan), "Kayacryl Black NP" or "Kayacryl Black NL" (trade name of a cationic dye produced and sold by Nippon Kayaku Co., Japan); a disperse dye such as "Diacelliton Black B" (trade name of a disperse dye produced and sold by Mitsubishi Chemical Industries Limited, Japan). "Kayalon Polyesten Black S-200" or "Kayalon Polyesten Black T" (trade name of a disperse dye produced and sold by Nippon Kayaku Co., Ltd.); an acid dye such as "Kayanol Milling Black TLB" (trade name of an acid dye produced and sold by Nippon Kayaku Co., Ltd., Japan) or "Suminol Milling Black VLG" (trade name of an acid dye produced and sold by Sumitomo Chemical Company Ltd., Japan); a metallized dye such as "Kayakalan Blue Black RL" (trade name of a metallized dye produced and sold by Nippon Kayaku Co., Ltd., Japan), "Lamyl Black BGL" or "Sumilan Black WA" (trade name of a metallized dye produced and sold by Sumitomo Chemical Company Ltd., Japan); a reactive dye such as "Sumifix Black E-NS" (trade name of a reactive dye produced and sold by Sumitomo Chemical Company Ltd., Japan); and the like. The kind of dye to be used is varied depending on the kinds of the transparent plate employed and the cured photopolymerized resin composition to be dyed. That is, it is preferred that a dye which does not dye the transparent plate employed but is capable of dying the formed relief of a cured photopolymerized resin composition be used.

As mentioned before, in the present invention, it is essential that a relief formed on the transparent plate be constituted of a plurality of relief line portions corresponding to a striped or lattice pattern and have at least their respective side surfaces roughened. In the present invention, when the image-bearing transparency having transparent portions and opaque portions which constitute a negative image of a predetermined striped pattern or lattice pattern and having a smooth surface is used, there is produced a relief constituted of relief line portions of which the respective side surfaces only are roughened. Whereas, when the image-bearing transparency having transparent portions and opaque portions which constitute a negative image of a predetermined striped pattern or lattice pattern and having a rough surface is used, there is produced a relief constituted of relief line portions of which the respective entire surfaces are roughened. However, in the present invention, there is little or no difference in light-shielding effect between the light-shielding screen having a relief constituted of relief line portions of which the side surfaces only are roughened and the light-shielding screen having a relief constituted of relief line portions of which the respective entire surfaces are roughened.

The present invention will be illustrated in more detail with reference to the following Examples, which should not be construed to be limiting the scope of the present invention. The parts are by weight, unless otherwise indicated.

In the following Examples, the properties of reflection preventive light-shielding screens and photopolymerizable compositions therefor are determined according to the following methods, unless otherwise indicated.

1. Surface Reflectance (1) Sample preparation: About 6 g of a photopolymerizable resin composition containing a delustering agent is poured onto a 9μ-thick polyester film superimposed on a 12 mm-thick transparent glass plate at its predetermined area to have a shape of 3 cm in width and 15 cm in length. Onto the photopolymerizable resin composition is placed a polyurethane adhesive-coated polyester film of 100μ in thickness and further a 5 mm-thick glass plate, and pressed with the hands whereby a photopolymerizable resin composition layer having a thickness of 1.0 mm is formed between the polyester films with the use of a spacer of the same thickness to form a laminate assembly. Actinic rays from a chemical lamp are irradiated over the laminate assembly on the side of the 5 mm-thick glass plate until photopolymerization of the photopolymerizable resin composition progresses to the middle in depth, leaving the remaining half portion of the photopolymerizable resin unpolymerized. Thereafter, the glass plates are removed and the 9 μ-thick polyester film is stripped off. Over the resin layer on the side of the resin remaining unpolymerized is sprayed an aqueous 1% by weight sodium borate solution to wash away the non-exposed, non-photopolymerized portion thereof, whereby a photocured plate having its one surface roughened is obtained. The photocured plate is rinsed with water, and immersed in a 70° to 80° C. hot bath containing 0.5% by weight of "Kayakalan Blue Black RL" (trade name of a metallized dye produced and sold by Nippon Kayaku Co., Ltd., Japan) for 10 minutes to dye the photocured plate.

(2) Determination: The surface reflectance of the resulting dyed photocured plate is measured using the Direct-reading Colorimetric Color Difference Computer CDE-CH4 (trade name of an instrument manufactured and sold by Suga Shikenki K.K., Japan).

2. Viscosity

The viscosity of a photopolymerizable resin composition is visually assessed.

3. Dispersibility

The dispersibility of a delustering agent in a photopolymerizable resin composition is visually examined or observed through a microscope.

4. Relief Formation

The relief formation of a photopolymerizable resin composition is collectively evaluated by way of a visual inspection, microscopic observation of the cross section of the relief and measurement of the height and width of the relief.

5. Ghost Phenomenon

A reflection preventive light-shielding screen is attached to a 20-inch color television set over its front panel, and the images on the fluorescent screen of the television set are observed at varied viewing angles to check whether or not there occurs a phenomenon of undesired duplicate images.

EXAMPLE 1

100 Parts of an unsaturated polyester resin having an acid value of 30 mg KOH/g prepared by effecting condensation polymerization of a mixture of propylene glycol, diethylene glycol, adipic acid, fumaric acid and isophthalic acid at a molar ratio of 0.12/0.38/0.24/0.14/0.12, 12 parts of diethylene glycol dimethacrylate, 30 parts of tetraethylene glycol dimethacrylate, 12 parts of 2-hydroxyethyl methacrylate, 6 parts of diacetone acrylamide, 2 parts of benzoin isobutyl ether and 0.03 part of 4-tert-butyl catechol were mixed at room temperature under a nitrogen atmosphere to obtain a photopolymerizable resin composition. To the so obtained photopolymerizable resin composition was added a delustering agent of varied kind at a varied amount an indicated in Table 1 given hereinbelow to obtain a photopolymerizable resin composition containing a delustering agent (Sample Nos. 1 to 7). The so obtained photopolymerizable resin composition was subjected to the above-mentioned surface reflectance determination, dispersibility examination and viscosity measurement, and the results are shown in Table 1 given below.

Then, about 65 g of the photopolymerizable resin composition containing a delustering agent was poured onto a 20 u-thick polypropylene film superimposed on a linear, in-parallel arranged striped pattern negative film of 0.1 mm in thickness having 150 μ-wide transparent portions and 300 μ-wide opaque portions which negative film is supported by a 12 mm- thick transparent glass plate. Onto the photopolymerizable resin composition was placed a 5 mm-thick, 48 cm-wide and 39 cm-long transparent glass plate having its surface, to be contacted with the photopolymerizable resin composition, treated with γ-methacryloxypropyl trimethoxysilane, and pressed with the hands to allow the resin composition to flow over the polypropylene film, whereby a photopolymerizable resin composition layer having a thickness of 300μ was formed between the polypropylene film and the glass plate with the use of a spacer of the same thickness. The resulting laminate assembly was exposed for about 120 seconds from the side of the negative film to actinic rays from a 3 KW ultra-high pressure mercury lamp placed at a distance of 120 cm from the surface of the laminate assembly, thereby causing the photopolymerizable resin composition to be photopolymerized and cured in the striped pattern. Thereafter, the glass plate supporting the negative film, the negative film and then the propylene film were stripped off. Over the cured, photopolymerized resin layer of the resulting assembly was sprayed a weakly alkaline solution (e.g. a 1% aqueous solution of sodium borate) heated to 40° to 45° C. from a nozzle placed at a distance of 5 mm from the cured, photopolymerized resin layer at a discharge pressure of 1 kg/cm²-gauge and a discharge rate of about 20 liters/minute to wash away the non-exposed, nonphotopolymerized areas of the resin layer, whereby a photo-relief plate was obtained. The so-obtained photorelief plate was rinsed with water, post-irradiated at an amount of light of 1,000 mJ/cm² for 20 minutes, dried at 50° C. for 10 minutes, and immersed in a 70° to 80° C. hot bath containing 0.5% by weight of "Kayakalan Blue Black RL" (trade name of a metallized dye produced and sold by Nippon Kayaku Co., Ltd., Japan) for 10 minutes to dye the photorelief. Further, the dyed photorelief plate was rinsed with water and dried at 50° C. for 10 minutes to obtain a reflection preventive light-shielding screen. The so-obtained reflection preventive light-shielding screen was subjected to the above-mentioned visual test with respect to the ghost phenomenon, and the results are also shown in Table 1 given below.

TABLE 1

| Sample No. | Delustering Agent Kind | Amount | Dispersi-bility | Viscosity | Surface Reflectance | Relief Formation | Ghost Phenomenon |
|---|---|---|---|---|---|---|---|
| 1 | None | 0 | — | comparison standard | 60% | good | Occur extensively |
| 2 | Finely divided silica (size* 3.5μ) | 5% | good | fairly high | 1% | good | Not occur |
| 3 | Finely divided silica (size* 3.5μ) | 10% | good | high | 1% | good | Not occur |
| 4 | Finely divided silica (size* 3.5μ) | 15% | fairly good | very high | 1% | fairly good | Not occur |
| 5 | Glass Pearl (size* 10μ) | 5% | fairly good | fairly high | 15% | good | Occur slightly (still practicable) |
| 6 | Glass Pearl (size* 10μ) | 10% | fairly good | high | 10% | good | Not occur |
| 7 | Titanium oxide (size* 10μ) | 2% | good | fairly high | 10% | fairly good | Not occur |

Note
*Size as used herein means the average particle diameter.

EXAMPLE 2

Using as a delustering agent a finely divided silica having an average particle diameter of 3.5μ in an amount of 5% based on the weight of the photo-polymerizable resin composition, substantially the same procedures as described in Example 1 were repeated except that a linear, in-parallel arranged striped pattern negative film of 0.1 mm in thickness having 100μ-wide transparent portions and 250μ-wide opaque portions was employed, and that the thickness of the photo-polymerizable resin composition layer was 250μ instead of 300μ, to obtain a reflection preventive light-shielding screen. The reflection preventive light shielding screen was attached to a computer display with a CRT over its front panel. It was found that the letters and symbols on the computer display were clear and sharp through the reflection preventive light-shielding screen without occurrence of any ghost phenomenon.

EXAMPLE 3

Using as a delustering agent a finely divided silica having an average particle diameter of 3.5μ in an amount of 15% based on the weight of the photo-polymerizable resin composition, substantially the same procedures as described in Example 1 were repeated except that the dying operation was omitted, to obtain a reflection preventive light-shielding screen. The screen was attached to a television set over its front panel, and subjected to visual tests with respect to the contrast and the occurrence of a ghost phenomenon. It was found that no ghost phenomenon occurred and that the contrast was as good as that brought about when the dying operation was not omitted.

EXAMPLE 4

Using as a delustering agent a finely divided silica having an average particle diameter of 3.5μ in an amount of 2% based on the weight of the photopolymerizable resin composition, substantially the same procedures as described in Example 1 were repeated except that a linear, in-parallel arranged striped-pattern negative film of 0.1 mm in thickness having 50μ-wide transparent portions and 100μ-wide opaque portions was employed, and that the thickness of the photopolymerizable resin composition layer was 100μ instead of 300μ, to obtain a reflection preventive light-shielding screen. The screen was attached to an electronic scale over its front panel, and subjected to visual tests with respect to the contrast and the occurrence of a ghost phenomenon. It was found that no ghost phenomenon occurred and that the contrast was very excellent.

EXAMPLE 5

Using as a delustering agent a finely divided silica having an average particle diameter of 3.5μ in an amount of 2% based on the weight of the photopolymerizable resin composition, substantially the same procedures as described in Example 1 were repeated except that a linear, orthogonal lattice pattern negative film of 0.1 mm in thickness having 75μ-wide transparent portions and 150μ-wide opaque portions was employed instead of a linear, in-parallel arranged striped pattern negative film having 150μ-wide transparent portions and 300μ-wide opaque portions, and that the thickness of the photo-polymerizable resin composition layer was 150μ instead of 300μ, to obtain a reflection preventive light-shielding screen. The screen was attached to a television set over its front panel and subjected to visual tests with respect to the contrast and the occurrence of a ghost phenomenon. It was found that no ghost phenomenon occurred and that the contrast was very excellent.

EXAMPLE 6

100 Parts of a polyurethane prepolymer prepared by reacting 1.0 part by mole of polypropylene adipate glycol, 1.0 part by mole of polyethylene propylene ether glycol and 3.0 parts by mole of tolylene diisocyanate (2,4-substituted: 80% and 2,6-substituted: 20%) using as a catalyst 0.2% by weight of dibutyltin laurate based on the total of polypropylene adipate glycol and polyethylene propylene ether glycol according to customary procedures, 10 parts of 2-hydroxypropyl methacrylate, 6 parts of lauryl methacrylate, 6 parts of diethylene glycol dimethacrylate, 2 parts of benzoin isobutyl ether and 0.03 part of 4-tert-butyl catechol were mixed at room temperature under a nitrogen atmosphere to obtain a photopolymerizable resin composition.

Using as a delustering agent a finely divided silica having an average particle diameter of 3.5μ in an amount of 2% based on the weight of the photopolymerizable resin composition, substantially the same procedures as described in Example 1 were repeated except that a 1% aqueous solution of dodecylbenzenesulfonic acid was used as the developer to obtain a reflection preventive light-shielding screen. The screen was attached to a television set over its front panel, and subjected to visual tests with respect to the contrast and the occurrence of a ghost phenomenon. It was found that no ghost phenomenon occurs and that the contrast was very excellent.

What is claimed is:

1. A reflection preventive light-shielding screen comprising a transparent plate and a plurality of relief lines of a cured photopolymerized resin composition supported by said transparent plate on its surface, said plurality of relief lines being arranged at spaced intervals with side surfaces and having at least their respective side surfaces roughened, said cured photopolymerized resin composition containing a delustering agent.

2. A reflection preventive light-shielding screen according to claim 1, wherein said relief is dyed.

3. A reflection preventive light-shielding screen according to claim 1, wherein said relief lines are arranged at intervals of 20 to 1,000μ and each have a height of 40 to 2,000μ and a width of 20 to 500μ, and wherein the ratio of said width to said interval is 1:5 to 1:1 and the ratio of said intervals to said height is 1:0.6 to 1:2.

4. A reflection preventive light-shielding screen according to claim 1, wherein said delustering agent is at least one member selected from the group consisting of titanium oxide, a powdered mica, calcium carbonate, a powdered glass, a finely divided silica, aluminum powder and a powdered clay.

5. A reflection preventive light-shielding screen according to claim 4, wherein said delustering agent is a finely divided silica.

6. A reflection preventive light-shielding screen according to claim 1, wherein said delustering agent is contained in the cured photopolymerized resin composition in an amount of 0.1 to 20% by weight based on the cured photopolymerized resin composition.

7. A reflection preventive light-shielding screen according to claim 1, wherein said plurality of relief lines are horizontal as viewed against said surface of the transparent plate.

8. A reflection preventive light-shielding screen according to claim 1, wherein said plurality of relief lines are vertical as viewed against said surface of the transparent plate.

9. A reflection preventive light-shielding screen according to claim 1, wherein said plurality of relief lines are aslant with a slating angle of 30° to 60° relative to the horizontal direction as viewed against said surface of the transparent plate.

10. A reflection preventive light-shielding screen according to claim 1, which further comprises a plurality of crossing relief lines arranged at spaced intervals which intersect said relief lines.

11. A reflection preventive light-shielding screen according to claim 10, wherein said crossing relief lines orthogonally intersect said relief lines as viewed against said surface of the transparent plate.

12. A reflection preventive light-shielding screen according to claim 10, wherein said relief lines are left aslant with a slating angle of 30° to 60° relative to the horizontal direction as viewed against said surface of the transparent plate and said crossing relief lines are right aslant with a slating angle of 30° to 60° relative to the horizontal direction as viewed against said surface of the transparent plate.

13. A process for producing a reflection preventive light-shielding screen which comprises:
   (1) interposing a layer of a photopolymerizable resin composition containing a delustering agent between a transparent plate and an image-bearing transparency having transparent portions and opaque portions which constitute a negative image of a predetermined pattern comprising a plurality of lines arranged at spaced intervals with side surfaces,
   (2) exposing said layer to an actinic light through said transparency to form cured photopolymerized resin composition portions and unpolymerized resin composition portions in said layer,
   (3) removing said transparency, and
   (4) removing the unpolymerized resin portions of said layer by means of a developer, thereby forming a plurality of relief lines corresponding to said plurality of lines of the negative image and having at least their respective side surfaces roughened.

14. A process for producing a reflection preventive light-shielding screen according to claim 13, wherein said layer of the photopolymerizable resin composition has a thickness of 40 to 2,000μ, and said transparent portions each have a width of 20 to 500μ and said opaque portions each have a width of 20 to 1,000μ.

15. A process for producing a reflection preventive light-shielding screen according to claim 13, wherein said delustering agent is a solid selected from the group consisting of titanium oxide, a powdered mica, calcium carbonate, a powdered glass, a finely divided silica, aluminum powder and a powdered clay.

16. A process for producing a reflection preventive light-shielding screen according to claim 15, wherein said delustering agent is a finely divided silica.

17. A process for producing a reflection preventive light-shielding screen according to claim 13, which further comprises dying said relief.

18. A method according to claim 13, wherein said predetermined pattern in step (1) further comprises a plurality of crossing lines arranged at spaced intervals which intersect said plurality of lines, and in step (4) in addition to said plurality of relief lines, there are formed a plurality of crossing relief lines corresponding to said plurality of crossing lines.

* * * * *

UNITED STATES PATENT AND TRADEMARK OFFICE
CERTIFICATE OF CORRECTION

PATENT NO. : 4,506,953

DATED : March 26, 1985

INVENTOR(S) : KUNIO SHIMIZU ET AL

It is certified that error appears in the above-identified patent and that said Letters Patent is hereby corrected as shown below:

Claim 9, line 3, change "slating" to --- slanting ---.

Claim 12, line 3, change "slating" to --- slanting ---.

Claim 12, line 6, change "slating" to --- slanting ---.

Signed and Sealed this

Twentieth Day of August 1985

[SEAL]

Attest:

DONALD J. QUIGG

Attesting Officer     Acting Commissioner of Patents and Trademarks